(12) United States Patent
Huang et al.

(10) Patent No.: US 10,147,948 B2
(45) Date of Patent: Dec. 4, 2018

(54) METHOD FOR FABRICATING GRAPHENE ELECTRODE

(71) Applicant: INDUSTRIAL TECHNOLOGY RESEARCH INSTITUTE, Hsinchu (TW)

(72) Inventors: Hsiao-Feng Huang, Taoyuan (TW);
Ping-Chen Chen, Taipei (TW);
Chun-Hsiang Wen, Hsinchu (TW);
Wei-Jen Liu, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 1 day.

(21) Appl. No.: 15/433,612

(22) Filed: Feb. 15, 2017

(65) Prior Publication Data

US 2017/0162873 A1    Jun. 8, 2017

Related U.S. Application Data

(62) Division of application No. 13/949,732, filed on Jul. 24, 2013, now abandoned.

(30) Foreign Application Priority Data

Nov. 21, 2012 (TW) .............................. 101143373 A

(51) Int. Cl.
| | | |
|---|---|---|
| *H01M 4/04* | (2006.01) | |
| *H01M 4/1393* | (2010.01) | |
| *H01M 4/583* | (2010.01) | |
| *H01M 10/0525* | (2010.01) | |
| *H01G 11/38* | (2013.01) | |
| *H01G 11/86* | (2013.01) | |
| *H01M 4/133* | (2010.01) | |
| *H01G 11/36* | (2013.01) | |
| *B05D 1/42* | (2006.01) | |
| *B05D 3/14* | (2006.01) | |
| *H01M 4/62* | (2006.01) | |

(52) U.S. Cl.
CPC .............. *H01M 4/583* (2013.01); *B05D 1/42* (2013.01); *B05D 3/148* (2013.01); *H01G 11/36* (2013.01); *H01G 11/38* (2013.01); *H01G 11/86* (2013.01); *H01M 4/0402* (2013.01); *H01M 4/0404* (2013.01); *H01M 4/0409* (2013.01); *H01M 4/0471* (2013.01); *H01M 4/133* (2013.01); *H01M 4/1393* (2013.01); *H01M 4/621* (2013.01); *H01M 4/624* (2013.01); *H01M 10/0525* (2013.01); *Y02E 60/13* (2013.01)

(58) Field of Classification Search
CPC ........ H01G 11/38; H01G 11/36; H01G 11/86; H01M 4/0402; H01M 4/133; H01M 4/1393; H01M 10/0525; H01M 4/0409; H01M 4/0404; H01M 4/624; H01M 4/621; H01M 4/583; H01M 4/0471; B05D 3/148; B05D 1/42; Y02E 60/13
See application file for complete search history.

(56) References Cited

U.S. PATENT DOCUMENTS

| | | | |
|---|---|---|---|
| 2011/0030991 A1* | 2/2011 | Veerasamy | ............. C30B 29/02 174/126.1 |
| 2011/0127471 A1 | 6/2011 | Shin et al. | |
| 2011/0313194 A1 | 12/2011 | Lee et al. | |
| 2012/0098028 A1 | 4/2012 | Naito | |
| 2012/0149897 A1 | 6/2012 | Jeon et al. | |
| 2013/0078436 A1 | 3/2013 | Naito et al. | |
| 2014/0030590 A1* | 1/2014 | Wang | ...................... H01B 1/04 429/211 |
| 2014/0315083 A1* | 10/2014 | Liu | ....................... H01M 4/366 429/217 |

FOREIGN PATENT DOCUMENTS

| | | |
|---|---|---|
| CN | 101717083 A | 6/2010 |
| CN | 102034975 A | 4/2011 |
| CN | 102208598 A | 10/2011 |
| CN | 102306781 A | 1/2012 |
| CN | 102543476 A | 7/2012 |
| CN | 102713025 A | 10/2012 |
| CN | 102745678 A | 10/2012 |
| CN | 102760866 A | 10/2012 |
| TW | 201111278 A | 4/2011 |
| TW | 201212289 A | 3/2012 |

OTHER PUBLICATIONS

Jeong, Hyung Mo et al., Nitrogen-Doped Graphene for High-Performance Ultracapacitors and the Importance of Nitrogen-Doped Sites at Basal Planes, Nano Letters, 2011, pp. 2472-2477.
Wang, Haibo et al., Nitrogen-doped graphene nanosheets with excellent lithium storage properties, Journal of Material Chemistry, 2011, pp. 5430-5434.
Wu, Zhong-Shuai et al., Doped Graphene Sheets as Anode Material withn Superhigh Rate and Large CaPACITY of Lithium Ion Batteries, American Chemical Society, 2011, pp. 5463-5471.
Li, Xiaolin et al., Simultaneous Nitrogen Doping and Reduction of Graphene Oxide, Journal of American Chemical Society, 2009, pp. 15939-15944.
Office Action dated Jun. 27, 2014 for the corresponding Taiwanese application No. 101143373.

(Continued)

*Primary Examiner* — Muhammad S Siddiquee
(74) *Attorney, Agent, or Firm* — Muncy, Geissler, Olds & Lowe, P.C.

(57) ABSTRACT

A graphene electrode, an energy storage device employing the same, and a method for fabricating the same are provided. The graphene electrode includes a metal foil, a non-doped graphene layer, and a hetero-atom doped graphene layer. Particularly, the hetero-atom doped graphene layer is separated from the metal foil by the non-doped graphene layer.

13 Claims, 4 Drawing Sheets

(56) References Cited

OTHER PUBLICATIONS

Office Action dated Jul. 1, 2015 in corresponding Chinese patent application No. 201210528039.1 (7 pages).
Office Action dated Aug. 2, 2016 in corresponding CN patent application No. 201210528039.1 (8 pages).

* cited by examiner

METHOD FOR FABRICATING GRAPHENE ELECTRODE

CROSS REFERENCE TO RELATED APPLICATIONS

This application is a Divisional of pending U.S. patent application Ser. No. 13/949,732, filed Jul. 24, 2013 and entitled "Graphene electrode, energy storage device employing the same, and method for fabricating the same", which claims priority from, Taiwan Application Serial Number 101143373, filed Nov. 21, 2012, the disclosure of which is hereby incorporated by reference herein in its entirety.

TECHNICAL FIELD

The disclosure relates to a method for fabricating a graphene electrode.

BACKGROUND

Due to rising concerns for environmental issues and higher gasoline prices, research and development of electric vehicles have received increased attention.

Conventional lithium ion batteries, however, cannot meet the requirements of high capacity, high power, and fast charging. In order to improve the properties of conventional lithium ion batteries, novel anode materials for replacing graphite material are desired.

Due to the superior electronic conductivity and the porous structure, electrons and lithium ion have high transport/diffusion mobility within a graphene layer. Further, due to the irregular structure of the graphene, the graphene has a higher capacity in comparison with the graphite. Due to the high irreversible capacity and low conductivity, the commercialization of lithium ion batteries employing the graphene electrode, however, cannot be achieved.

SUMMARY

One embodiment of the disclosure provides a graphene electrode and a method for fabricating the same. Since the hetero-atom is doped into the surface of a graphene at a low temperature by a dry-process surface modification treatment, the obtained graphene electrode can have high capacity and low irreversible capacity. On the other hand, the graphene electrode of the disclosure is suitable for being used in energy storage devices.

The graphene electrode of the disclosure includes: a metal foil, a non-doped graphene layer, and a hetero-atom doped graphene layer, wherein the hetero-atom doped graphene layer is separated from the metal foil by the non-doped graphene layer.

The disclosure also provides a method for fabricating the aforementioned graphene electrode. The method includes: providing the metal foil; forming the graphene layer on the metal foil; and subjecting the graphene layer to a dry-process surface modification treatment, thereby doping the hetero-atoms into the graphene layer surface.

According to an embodiment of the disclosure, the disclosure further provides an energy storage device, wherein the energy storage device includes the aforementioned graphene electrode serving as a first electrode, a second electrode, and an isolation membrane disposed between the first electrode and the second electrode.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
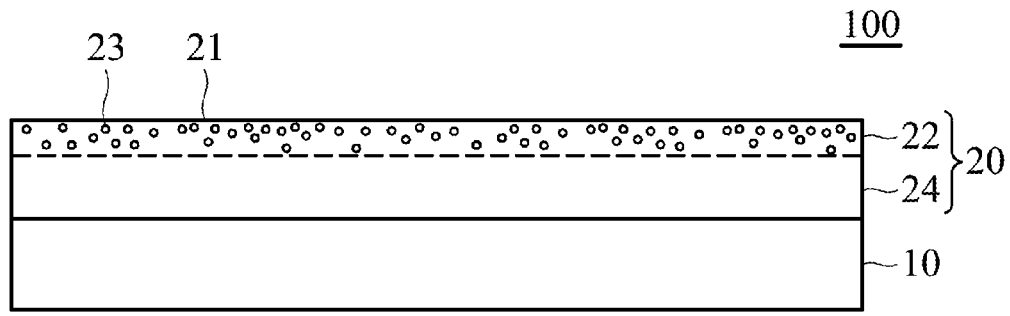
FIG. 1 is a cross-section of a graphene electrode according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, the graphene electrode of the disclosure 100 can include a metal foil 10, wherein a graphene layer 20 is disposed on the metal foil 10. Particularly, the graphene layer 20 includes a non-doped graphene layer 24, and a hetero-atom doped graphene layer 22. It should be noted that, the hetero-atom doped graphene layer 22 and the metal foil 10 are separated by the non-doped graphene layer 24. Suitable materials of the metal foil 10 can be a conductive metal, such as a copper foil. The thickness of the metal foil 10 is unlimited and can be between 0.1 and 200 μm. The hetero-atom doped graphene layer 22 includes the surface 21 of the portion of the graphene layer 20 which is doped with the hetero-atoms 23. Further, the portion, which is not doped with the hetero-atom 23 of the graphene layer 20, is defined as the non-doped graphene layer 24. The hetero-atoms 23 can be nitrogen atoms, phosphorous atoms, boron atoms, or combinations thereof. The hetero-atom doped graphene layer 22 can have a hetero-atom doping dosage of 0.1-3 atom %, based on the total atomic amount of the hetero-atom doped graphene layer 22. The non-doped graphene layer 24 can be a single-layer graphene, or graphene nanosheets or combinations thereof. The hetero-atom doped graphene layer 22 can be a single-layer hetero-atom doped graphene, or hetero-atom doped graphene nanosheets, or combinations thereof.

Figure 2:
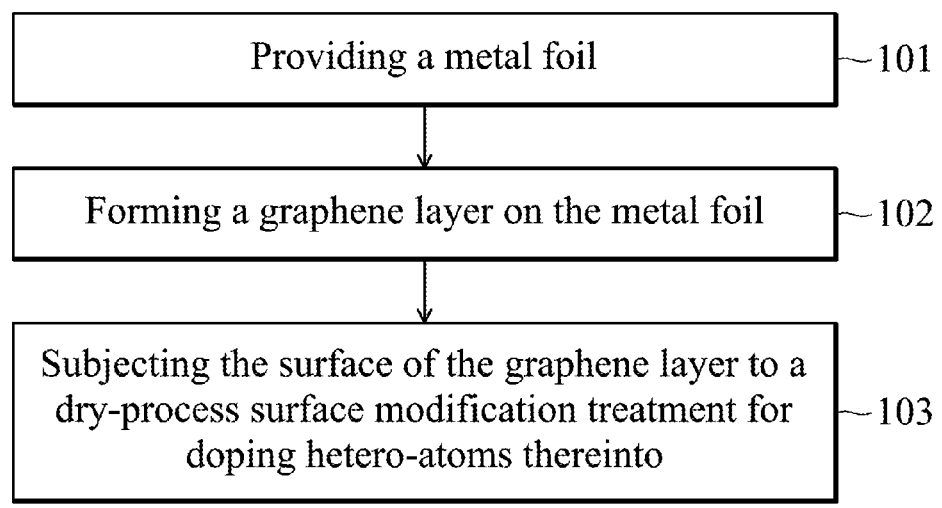
FIG. 2 is a flow chart illustrating the method for fabricating the aforementioned graphene electrode according to an exemplary embodiment.

The disclosure also provides a method for fabricating the aforementioned graphene electrode. FIG. 2 is a flow chart illustrating the method for fabricating the aforementioned graphene electrode according to an embodiment of the disclosure. First, a metal foil is provided (step 101), wherein the metal foil can be a copper foil. Next, a graphene layer is formed on the metal foil (step 102). Finally, the graphene layer is subjected to a dry-process surface modification treatment for doping the hetero-atoms into the surface of the graphene layer (step 103). In the dry-process surface modification treatment, the hetero-atoms are doped into a part of the graphene layer (i.e. the surface of the graphene layer), to form a hetero-atom doped graphene layer and a non-doped graphene layer (the portion of the graphene layer which is not doped with the hetero-atom).

The dry-process surface modification treatment, for example, can be a plasma modification process. It should be noted that, since the hetero-atoms have to be confined within the surface of the graphene layer rather than the whole graphene layer, the graphene layer or metal foil must not be heated during the dry-process surface modification treatment. Further, a reactive gas is introduced into the reactor of the plasma modification process to the hetero-atoms into the graphene layer.

For example, the reactive gas includes a gas containing the hetero-atoms (such as nitrogen gas, ammonia gas, air, or combinations thereof), or a mixture of the gas containing the hetero-atoms (such as nitrogen gas, ammonia gas, air, or combinations thereof) and other gas (such as hydrogen gas, argon gas, oxygen gas, or combinations thereof). According to another embodiment of the disclosure, a carrier gas can be introduced into the reactor of the plasma modification process, in order to stabilize the plasma modification process. The carrier gas can include helium gas, argon gas, nitrogen gas, neon gas, or combinations thereof. The reactor of the plasma modification process can be a low pressure plasma reactor or an atmospheric pressure plasma reactor. In the plasma modification process, the parameters (such as the reactive gas flow, the carrier gas flow, the reaction pressure, the power, the reaction time, and the distances between the graphene layer and electrodes of the reactor) can be optionally adjusted, assuming that the doped amount of heteroatoms in the hetero-atom doped graphene layer is from 0.1 to 3 atom %, based on the total atomic amount of the hetero-atom doped graphene layer.

According to an embodiment of the disclosure, the method for forming the graphene layer includes the following steps. First, a coating prepared from a graphene-containing composition is formed on the metal foil, wherein the method for forming the coating on the metal foil can be a screen printing, spin coating, bar coating, blade coating, roller coating, or dip coating method.

Next, the coating is subjected to a drying process, obtaining the graphene layer. The drying process can be performed at 40-150° C. for a period of time from 1 min to 10 hrs. Herein, the graphene-containing composition can include a graphene, and a binder. According to other embodiments of the disclosure, the graphene-containing composition can further include a conducting agent. The binder can be an aqueous-based binder, an organic-based binder, such as carboxymethyl cellulose (CMC), styrene butadiene rubber (SBR), or polyvinylidene difluoride (PVdF), or combinations thereof. The conducting agent can be, for example, graphite, carbon black, or combinations thereof.

Figure 3:
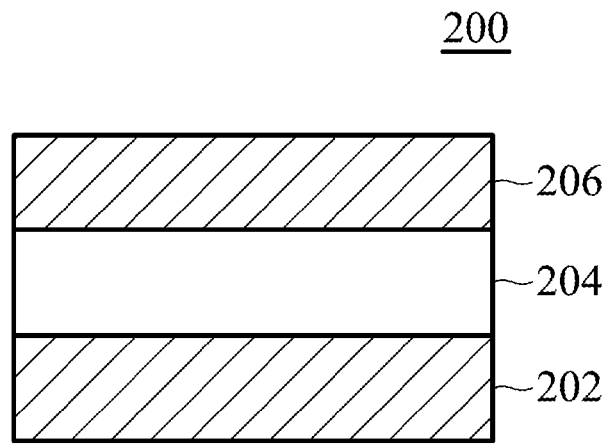
FIG. 3 is a cross-section of an energy storage device according to an exemplary embodiment.

As shown in FIG. 3, the disclosure also provides an energy storage device (such as a lithium ion battery, supercapacitor or fuel cell) 200, including the aforementioned graphene electrode 100. The energy storage device 200 can include a graphene electrode serving as a first electrode 202 (such as anode), a second electrode 206 (such as cathode), and an isolation membrane 204 disposed between the first electrode 202 and the second electrode 206. It should be noted that the hetero-atom doped graphene layer of the graphene electrode directly contacts to the isolation membrane. Suitable materials of the second electrode 206 can be lithium or lithium-containing oxide such as Li, $LiCoO_2$, $LiFePO_4$, $LiCo_{1/3}Ni_{1/3}Mn_{1/3}O_2$, $LiMn_2O_4$ or combinations thereof. Suitable materials of the isolation membrane can be polymer, such as polyethylene, polypropylene, or combinations thereof. Further, the isolation membrane can have a plurality of pores. The energy storage device can further include an electrolysis (not shown) within the isolation membrane 204, such as ethylene carbonate (EC), propylene carbonate (PC), gamma-butyrolactone (GBL), diethyl carbonate (DEC), dimethyl carbonate (DMC), ethyl methyl carbonate (EMC), methyl propyl carbonate (MPC), vinylene carbonate (VC), lithium salt, or combinations thereof.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of the Graphene Electrode

Example 1

First, 5.3571 g of DI water, and 0.0337 g of carboxymethyl cellulose (CMC, serving as a binder) were added into a reaction bottle, and stirred by a homogenizer (with a spinning rate of 2000 rpm) for 20 min. Next, 0.0056 g of acetylene black (sold and manufactured by Timcal with a trade number of Super P, serving as a conducting agent), and 0.5 g of graphene were added into the reaction bottle. After stirring for 20 min, 0.0562 g of styrene butadiene rubber (SBR, serving as binder) was added into the reaction bottle. After stirring for 20 min, a graphene-containing slurry was obtained.

Next, the above graphene-containing slurry was coated on a copper foil by blade coating (using the doctor blade (150 μm) to form a coating. After drying at 120° C., a graphene electrode (I) having the graphene layer was obtained. It should be noted that the graphene layer of the graphene electrode (I) was not doped with any hetero-atom.

Example 2

The graphene electrode (I) was disposed into a plasma reactor, wherein the copper foil of the graphene electrode (I) directly contacted with a support substrate of the plasma reactor, and the distance between the graphene layer and the electrode of the plasma reactor was 2.2 mm. Next, a nitrogen gas (with a flow of 5 sccm) and a helium gas (with a flow of 5.88 L/min) were introduced into the plasma reactor. Next, the surface of the graphene layer was subjected to a plasma modification process under a pressure of 1 atm, and a RF power of 65 W, in order to dope nitrogen atoms into the surface of the graphene layer. It should be noted that no heating process was performed during the plasma modification process. After reacting for 6 sec, a graphene electrode (II) was obtained.

Figure 4:
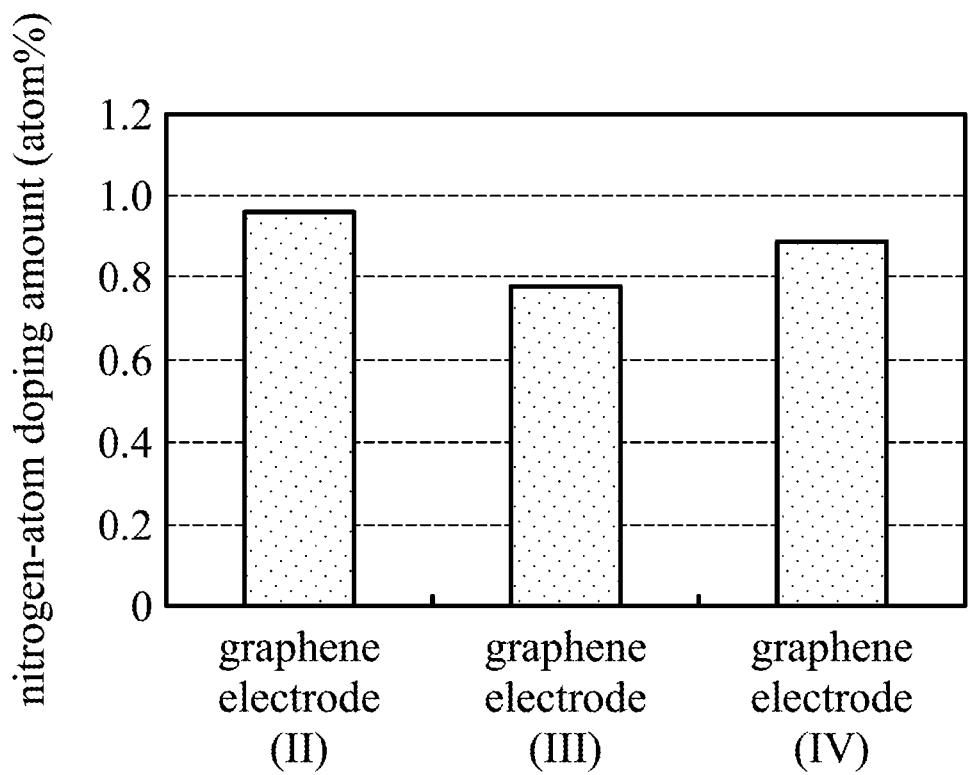
FIG. 4 shows a graph plotting the nitrogen-atom doping amount of the graphene electrodes (II)-(IV).

Next, the surface of the graphene electrode (II) was analyzed by an X-ray Photoelectron Spectrometer (XPS) to measure the doping amount of nitrogen atoms of the hetero-atom doped graphene layer of the graphene electrode (II). The results are as shown in FIG. 4.

Example 3

Example 3 was performed as Example 2 except that the flow rate of the nitrogen gas was increased to 30 sccm instead of 5 sccm. The graphene electrode (III) was obtained.

Next, the surface of the graphene electrode (III) was analyzed by an X-ray Photoelectron Spectrometer (XPS) to measure the doping amount of nitrogen atoms of the heteroatom doped graphene layer of the graphene electrode (III). The results are shown in FIG. 4.

Example 4

Example 4 was performed as Example 1 except that the reaction time was changed to 18 sec instead of 6 sec. The graphene electrode (IV) was obtained.

Next, the surface of the graphene electrode (IV) was analyzed by an X-ray Photoelectron Spectrometer (XPS) to measure the doping amount of nitrogen atoms of the heteroatom doped graphene layer of the graphene electrode (IV). The results are shown in FIG. 4.

According to FIG. 4, the nitrogen atoms were observed as the impurities in the surface of the graphene electrodes (II)-(IV) of the disclosure. Therefore, the nitrogen atoms were indeed doped into the surface of the graphene layer via the plasma modification process.

Example 5

Example 5 was performed as Example 2 except that the flow rate of nitrogen gas was changed to 15 sccm and the reaction time was 18 sec instead of the flow rate of 5sccm and the reaction time of 6 sec. The graphene electrode (V) was obtained.

Example 6

Example 6 was performed as Example 2 except that the flow rate of nitrogen gas was adjusted at 30 sccm and the reaction time was 18 sec. The graphene electrode (VI) was obtained. Table 1 showed the parameters of the plasma modification process employed in Example 2-6.

TABLE 1

|  | flow rate of nitrogen gas (sccm) | flow rate of helium gas (L/cm) | RF power (W) | reaction time (sec) |
| --- | --- | --- | --- | --- |
| Example 2 | 5 | 5.88 | 65 | 6 |
| Example 3 | 30 | 5.88 | 65 | 6 |
| Example 4 | 5 | 5.88 | 65 | 18 |
| Example 5 | 15 | 5.88 | 65 | 18 |
| Example 6 | 30 | 5.88 | 65 | 18 |

Fabrications of the Battery Having the Graphene Electrode

Example 7

The graphene electrode (I) of Example 1 was cut to form an anode (with a diameter of 13 mm). Next, the anode, an isolation membrane (a polyethylene/polypropylene composite film with a thickness of 20 μm), and a lithium layer (serving as a cathode) were assembled. Next, an electrolyte (including ethylene carbonate (EC), ethyl methyl carbonate (EMC), vinylene carbonate (VC), and 1 M of $LiPF_6$) was injected into the isolation membrane, and a button-type lithium ion battery (I) was obtained.

Example 8

The graphene electrode (IV) of Example 1 was cut to form an anode (with a diameter of 13 mm). Next, the anode, an isolation membrane (a polyethylene/polypropylene composite film with a thickness of 20 μm), and a lithium layer (serving as a cathode) were assembled. Next, an electrolyte (including ethylene carbonate (EC), ethyl methyl carbonate (EMC), vinylene carbonate (VC), and 1M of $LiPF_6$) was injected into the isolation membrane, and a button-type lithium ion battery (II) was obtained.

Example 9

The graphene electrode (V) of Example 1 was cut to form an anode (with a diameter of 13 mm). Next, the anode, an isolation membrane (a polyethylene/polypropylene composite film with a thickness of 20 μm), and a lithium layer (serving as a cathode) were assembled. Next, an electrolyte (including ethylene carbonate (EC), ethyl methyl carbonate (EMC), vinylene carbonate (VC), and 1 M of $LiPF_6$) was injected into the isolation membrane, and a button-type lithium ion battery (III) was obtained.

Example 10

The graphene electrode (VI) of Example 1 was cut to form an anode (with a diameter of 13 mm). Next, the anode, an isolation membrane (a polyethylene/polypropylene composite film with a thickness of 20 μm), and a lithium layer (serving as a cathode) were assembled. Next, an electrolyte (including ethylene carbonate (EC), ethyl methyl carbonate (EMC), vinylene carbonate (VC), and 1 M of $LiPF_6$) was injected into the isolation membrane, and a button-type lithium ion battery (IV) was obtained.

Electrical Test

Figure 5:
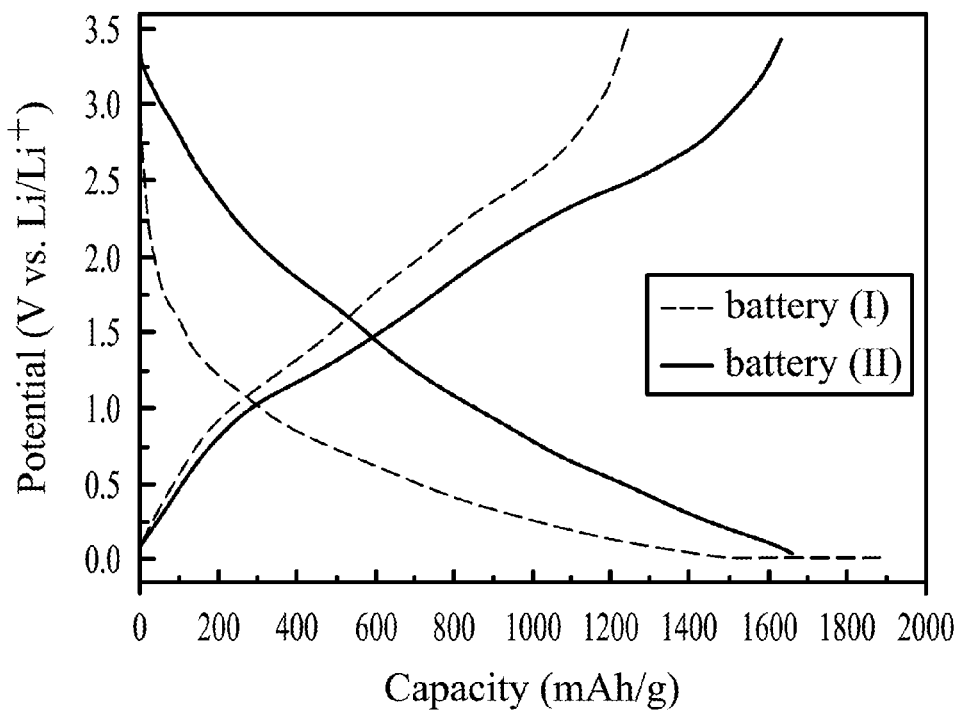
FIG. 5 shows a graph plotting the charge-discharge curves of the batteries (I) and (II).

The batteries (I) and (II) of Examples 7-8 were subjected to a charge-discharge test respectively, and the results are shown in FIG. 5.

Figure 6:
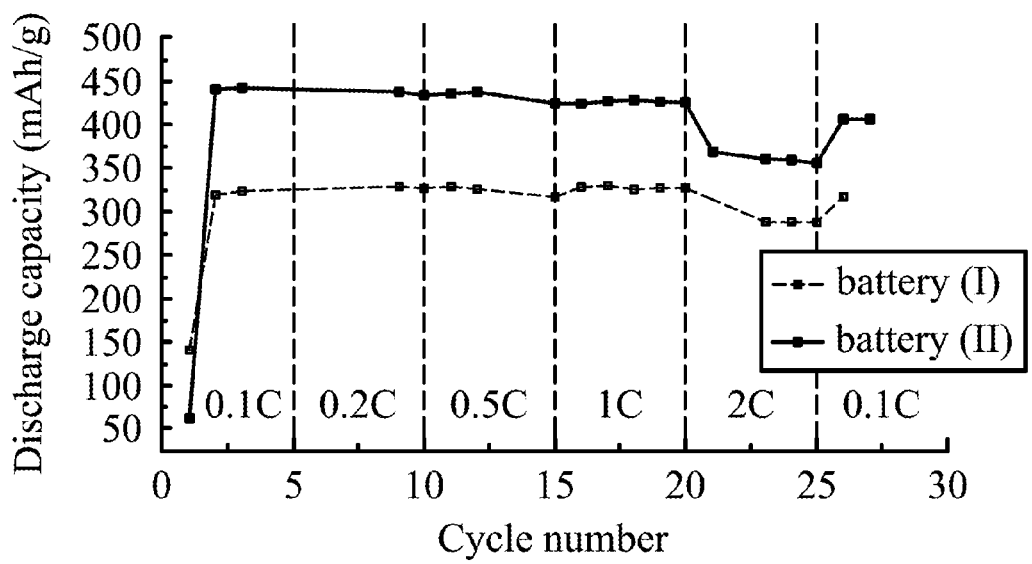
FIG. 6 shows a graph plotting discharge capacity against C-rates of the batteries (I) and (II).

Next, the discharge capacities of the batteries (I) and (II) were evaluated under various C-rates at room temperature, and the results are shown in FIG. 6. In FIG. 6, the battery (II) (having the nitrogen-atom doped grapheme layer) had higher discharge capacities in comparison with those of the battery (I) under various C-rates.

Figure 7:
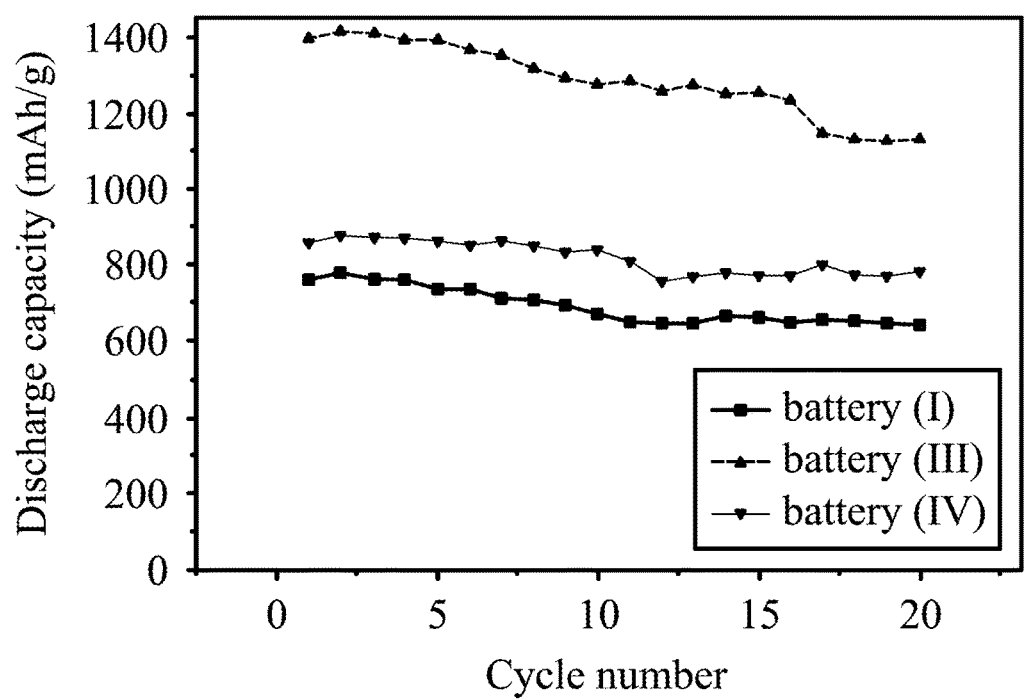
FIG. 7 shows a graph plotting charge-discharge cycles against discharge capacity of the batteries (I), (III), and (IV).

Next, the batteries (I), (III), and (IV) were subjected to a cycle life test, and the results are shown in FIG. 7. In FIG. 7, the batteries (III) and (IV) (having the nitrogen-atom doped grapheme layer) had a higher capacities in comparison with those of the battery (I) under various cycles. Particularly, the batteries had more than double the capacities as compared to that of the battery (I). Further, as shown in FIG. 7, the performances of the batteries (III) and (IV) were maintained over multiple cycles.

The batteries (I), (II), and (III) were subjected to a charging and discharging cycle tests and measured for evaluating the irreversible capacity loss and Coulombic efficiencies thereof. The results are shown in Table 2.

TABLE 2

|  | first cycle (charge) mAh/g | first cycle (discharge) mAh/g | Coulombic efficiency (%) | irreversible capacity loss (%) | second cycle (charge) mAh/g | second cycle (discharge) mAh/g | Coulombic efficiency (%) | irreversible capacity loss (%) |
| --- | --- | --- | --- | --- | --- | --- | --- | --- |
| Battery (I) | 1079.78 | 666.29 | 61.71 | 38.29 | 951.69 | 886.29 | 93.13 | 6.87 |
| Battery (II) | 1178.37 | 964.89 | 81.88 | 18.12 | 835.67 | 820.22 | 98.15 | 1.85 |
| Battery (III) | 1103.93 | 838.48 | 75.95 | 24.05 | 849.72 | 827.25 | 97.36 | 2.64 |

As shown in Table 2, the batteries (II) and (III) having the graphene electrode of the disclosure had an increased Coulombic efficiency and a reduced irreversible capacities in comparison with the battery (I) in both the first cycle and second cycle. This means that the graphene electrode subjected to the plasma modification process had stable electrical characteristics.

Accordingly, since the surface of the graphene layer was subjected to a dry-process surface modification treatment, the graphene electrode of the disclosure exhibited improved electrical characteristics (such as high capacity, high carrier mobility, and low irreversible capacity). Therefore, the graphene electrode of the disclosure is suitable for being used in an energy storage device.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for fabricating a graphene electrode, comprising:
    providing a metal foil;
    forming a graphene layer on the metal foil; and
    doping hetero-atoms into a part of the graphene layer to form a hetero-atom doped graphene layer and a non-doped graphene layer.

2. The method as claimed in claim 1, wherein the hetero-atoms comprise nitrogen atoms, phosphorous atoms, boron atoms, or combinations thereof.

3. The method as claimed in claim 1, wherein the hetero-atoms are doped into the surface of the graphene layer, forming the hetero-atom doped graphene layer.

4. The method as claimed in claim 1, wherein the non-doped graphene layer is not doped with the hetero-atoms.

5. The method as claimed in claim 1, wherein the steps for forming the graphene layer comprise:
    forming the coating on the metal foil, wherein the coating is formed from a graphene-containing composition; and
    subjecting the coating to a drying process, obtaining the graphene layer.

6. The method as claimed in claim 5, wherein the graphene-containing composition comprises:
    a graphene; and
    a binder.

7. The method as claimed in claim 6, wherein the binder comprises an aqueous-based binder, an organic-based binder, or combinations thereof.

8. The method as claimed in claim 6, wherein the graphene-containing composition further comprises a conducting agent.

9. The method as claimed in claim 8, wherein the conducting agent comprises graphite, carbon black, or combinations thereof.

10. The method as claimed in claim 1, wherein doping hetero-atoms into a part of the graphene layer is performed by a plasma modification process.

11. The method as claimed in claim 10, wherein a reactive gas is introduced during the plasma modification process, and the reactive gas comprises nitrogen gas, ammonia gas, air, or combinations thereof.

12. The method as claimed in claim 11, wherein the reactive gas further comprises argon gas, hydrogen gas, oxygen gas, or combinations thereof.

13. The method as claimed in claim 11, wherein a carrier gas is introduced during the plasma modification process, and the carrier gas comprises helium gas, argon gas, nitrogen gas, neon gas, or combinations thereof.

* * * * *